Oct. 27, 1925.  1,558,531
J. G. ZUBER
CYLINDER BORING MACHINE
Filed Dec. 27, 1920   2 Sheets-Sheet 2
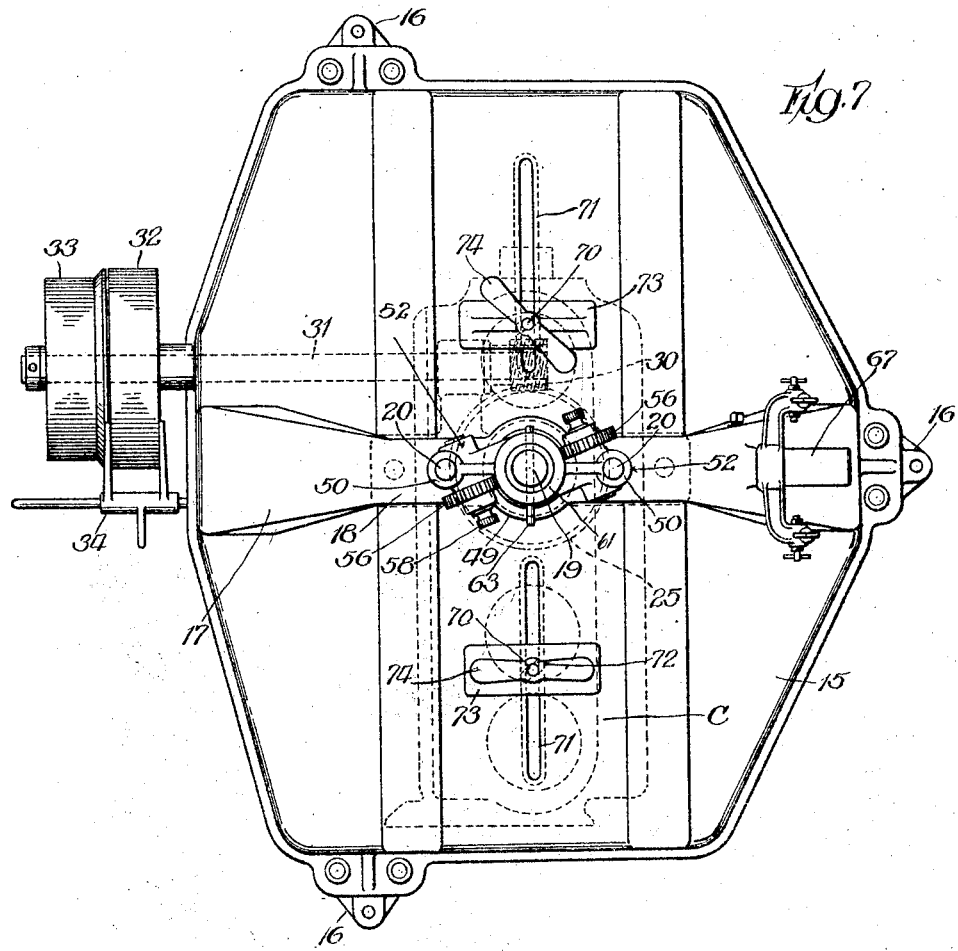
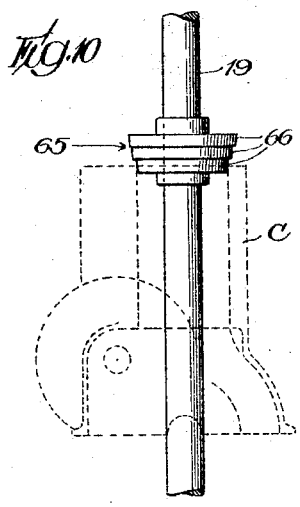
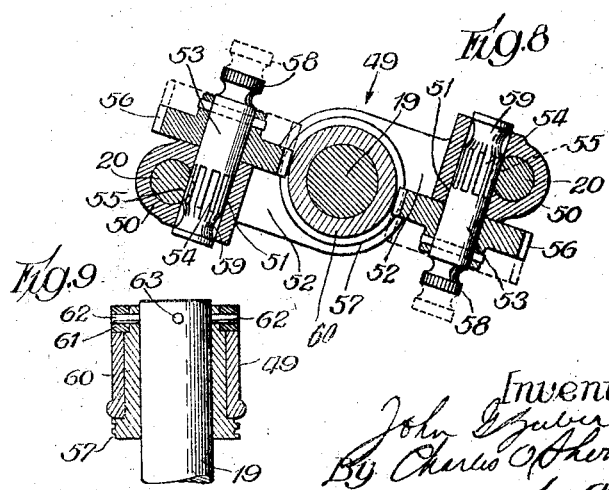
Inventor
John Zuber
By Charles O. Hervey
his Atty.

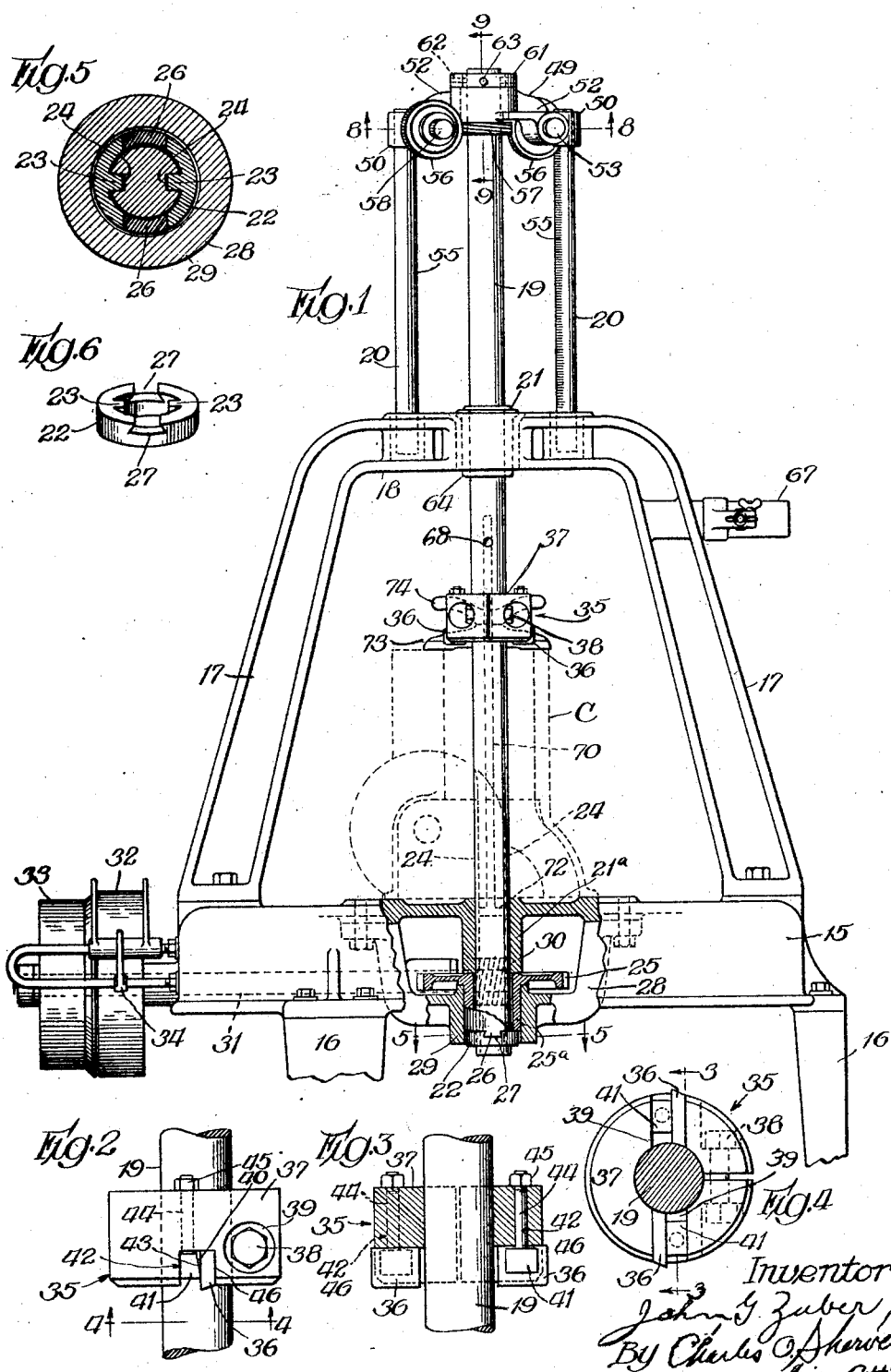

Patented Oct. 27, 1925.

1,558,531

UNITED STATES PATENT OFFICE.

JOHN G. ZUBER, OF CHICAGO, ILLINOIS.

CYLINDER-BORING MACHINE.

Application filed December 27, 1920. Serial No. 433,198.

*To all whom it may concern:*

Be it known that I, JOHN G. ZUBER, a citizen of the United States and a resident of Chicago, Cook County, and State of Illinois, have invented certain new and useful Improvements in Cylinder-Boring Machines, of which the following is declared to be a full, clear, and exact description.

This invention relates to boring machines and more particularly to machines for reboring engine or motor cylinders. In its present form it has been especially designed for re-boring the cylinders of motors for automobiles or other motor driven vehicles, although it may be used for boring cylinders of various other types.

In the ordinary service stations for motor vehicles, and in the ordinary machine shops that rebore and repair motor cylinders, there is a great need for a simple, highly efficient, and practical boring machine that may be operated by more or less skilled mechanics, and the present invention has been designed to furnish such a machine. When cylinder walls of internal combustion engines become scored or worn considerably, the engines do not function properly and the cylinders must be rebored to obtain the maximum efficiency from the engine and the principal object of this invention is to provide a simple practical and highly efficient boring machine that may be operated by the ordinary skilled mechanic. Another object is to provide means whereby the boring bar may be driven and moved endwise without any unnecessary wear on its bearings, whereby it may be constantly maintained in perfect alignment. Another object is to provide simple, automatic feed mechanism for the boring bar, actuated by the boring bar itself. Another object is to provide improved means for centering the cylinder to be rebored and for mounting the tools on the boring bar. Another object is to provide a boring machine of simple and improved construction, on which the cylinder block (to be rebored) may be readily clamped in place, and having bearings for the boring bar located above and below the cylinder block.

With these and other objects and advantages in view, this invention consists in the several novel features hereinafter fully set forth and claimed.

The invention is clearly illustrated in the accompanying drawings, in which:—

Fig 1 is a side elevation, partly broken away, of a cylinder boring machine embodying a simple form of the present invention; Fig. 2 is a detail, side elevation of a fragment of the boring bar and boring head; Fig. 3 is a detail, vertical cross section taken on line 3—3 of Fig. 4; Fig. 4 is a detail horizontal section taken on line 4—4 of Fig. 2; Fig. 5 is a detail, horizontal section taken on line 5—5 of Fig. 1; Fig. 6 is a perspective view of a drive collar; Fig. 7 is a plan of the machine; Fig. 8 is a detail, horizontal section taken on line 8—8 of Fig. 1; Fig. 9 is a detail, vertical, fragmental section taken on the line 9—9 in Fig. 1, and Fig. 10 is a side elevation of the boring bar and a centering tool, a cylinder block being illustrated in dotted lines in connection therewith.

Referring to said drawings, the reference character 15 designates a base of strong and substantial construction, having a substantially flat upper face on which the cylinder block is clamped, said base being supported by legs 16. Secured to said base 15 and extending up therefrom is a standard 17 which may be in the form of an arch, as shown, having at its upper end, a horizontal part 18 for the reception of the boring bar 19 and certain posts or bars 20 that form part of the feed mechanism for the boring bar. Said boring bar 19 is in the form of a round rod and is rotatably mounted in bearings 21, 21ª, in the standard 17 and base 15 respectively. Said boring bar is capable of endwise movement in said bearings as well as a rotary movement therein.

The boring bar is driven by drive mechanism which will now be described. On the lower end of said boring bar is a driver collar 22 which may have a loose fit on the boring bar and said drive collar 22 has a driving connection with the boring bar, comprising lugs or other inwardly projecting keys or the like 23 that enter and engage in vertical grooves or keyways 24 that are formed in the boring bar 19. This key and keyway arrangement provides for endwise movement of the boring bar in the drive collar. Said collar is connected to and driven by a worm gear wheel 25, which has a hub portion 25ª that surrounds the boring bar immediately above the collar 22, and has downwardly projecting drive lugs 26 that engage in notches 27 formed in the upper face of the collar 22. Preferably, the sides of the notches 27 of the collar are beveled back or under-cut, and the corresponding sides of the lugs 26 are beveled or shaped to conform to said edges of the notches. This arrangement provides means for supporting the collar 22 by the hub portion 25ª of the worm gear wheel 25 and provides a driving connection therebetween, which permits of slight radial movement of one relative to the other in the direction of a line connecting the lugs. The collar also has a slight radial movement in a direction at right angles to such movement between the lugs 26. In other words, the collar 22 is a floating, compensating drive connection between the worm gear wheel 25 and boring bar 19, which permits of independent rotation of the worm gear wheel around an axis of its own and out of true or non-centric with respect to the boring bar which may occur in case the bearing for the worm gear wheel becomes worn. A bearing bracket 28 secured to the underside of the base 15 has a bearing boss 29 on which the worm gear wheel 25 rests and in which the hub portion 25ª of said wheel is journalled.

A worm drive pinion 30, fast on a drive shaft 31, meshes with the worm gear wheel 25, and drives the latter. Said shaft 31 is journalled in bearings carried by the base 15 and has tight and loose pulleys 32, 33, on its outer end. A belt shifter 34 is provided for shifting the belt from one pulley to the other.

On the boring bar 19 is removably secured to the boring head 35 which contains the cutting tools 36. Said boring head comprises a split collar 37 which is secured to the boring bar by a clamp screw 38. In the lower face of the collar 37 are notches 39 which receive the cutting tools 36. Said cutting tools 36 have inclined faces 40 against which are placed the heads 41 of tool clamping members 42 which are provided with correspondingly inclined faces 43 that bear against said inclined faces of the tools. Said tool clamping members 42 are formed with threaded shanks or stems 44 that extend up through holes in the collar 37 and have nuts 45 on their threaded ends whereby the heads 41 of the tool clamping members may be drawn upwardly to wedge the tools securely in place against the vertical faces 46 of the notches. Said tools are formed with cutting edges on their lower and outer edges. The boring head 35 may be readily adjusted along the boring bar or removed therefrom by loosening the clamp screw 38.

The boring bar feed mechanism will now be described. Guided to move vertically on the posts 20, is a cross head or bracket 49, which is formed with bearing lugs 50 that encircle the posts. Extending transversely through bearing apertures 51 in the arms 52 of the cross head or bracket 49 are short shafts 53, which have teeth cut therein to provide pinions 54 that mesh with teeth of racks 55 formed on the posts 20. Secured on said short shafts 53 are worm gear wheels 56 that mesh with a worm gear 57 which is detachably mounted on the boring bar 19 and rotates with it in the boring operation. The short shafts 53 are lengthwise movable in their bearings, whereby the pinions 54 may be drawn out of mesh with the racks 55, and knurled heads or knobs 58 are provided upon said short shafts to facilitate their retraction. Beyond the pinion portions 54 of the short shafts they are formed with annular grooves 59 which when moved in front of the posts, permit the cross bar or bracket and parts associated therewith, to be freely raised or lowered on the posts without effecting the pinions. The extreme ends of the short shafts beyond the grooves form stops that encounter the posts whenever the short shafts are retracted, and thereby prevent the short shafts from being entirely withdrawn and also permit the said shafts and their pinions to be demeshed from the racks without entirely demeshing the worm gear wheels 56 from the worm gear 57. Said worm gear 57 has a hub portion 60 which extends up through the cross-head and has a collar 61 fixedly secured thereto as by pins 62 and a removable pin 63 extending through the collar 61, hub portion 60 and boring bar 19 fixedly connects the worm gear 57 to the boring bar 19. Normally, said boring bar is kept from rotating by the worm gears 25, 30, and is supported upon the cross-head 49 by the collar 61, the cross head being supported in raised position by reason of the intermeshing connection between the pinions 54 and racks 55 and the worm gear wheels 56 and worm gear 57.

Clamps are provided for clamping the cylinder block upon the base and said clamps may comprise clamp rods 70 that extend through slots 71 in the base and have heads 72 on their lower heads that engage with the underside of the base. Clamp plates 73 are provided to bear upon the cylinder blocks and said clamp rods extend through said clamp plates and have threaded clamp nuts 74 on their upper ends that may be screwed down to clamp the clamp plates upon the cylinder block.

To obtain perfect alignment of the boring bar and to maintain a perfect parallelism between said boring bar 19 and posts 20, the boring bar is mounted in a bushing 64 located in the part 18 of the standard 17, around which bushing Babbitt metal is poured. The posts 20 are also set in Babbitt metal which is poured into the sockets that receive them.

For properly centering a cylinder with respect to the boring bar and cutting tools, a centering device 65 is employed (see Fig. 10). Said centering device has a plurality of tapered or conical faces 66, of graduated and predetermined diameter, increasing in diameter as the faces progress upwardly. The use and operation of this centering device will be explained presently.

On the side of the standard 17 is supported a gauge 67 which forms no part of this invention, but which is used to locate and adjust the cutting tools to the required diameter of cylinder to be bored.

In the operation of the machine, the boring head 35 is disconnected from the boring bar 19, the pin 63 withdrawn and the boring bar raised to clear the cylinder block to be bored, and the pin is then inserted through the collar 61, hub 60 of the worm gear 57 and through a hole 68 in the boring bar. The latter is thereby suspended on the cross head by the collar 61, the cross head being supported by the posts 20 and worm gearing. The cylinder block to be re-bored, (one of which is illustrated in dotted lines at C) is then placed on the base with one of the cylinders in substantial alignment with the boring bar. The centering device 65 is then slipped up on the boring bar, the pin 63 withdrawn, the boring bar lowered to bring its lower end into the bearing at the base and the pin 63 inserted through the hole in the collar 61 and through the hole in the top of the boring bar. The cylinder block may now be shifted about on the base until the proper tapered face of the centering device enters the bore of the cylinder and thereupon the clamp nuts 74 are screwed down to tightly clamp the cylinder block in place on the base. The pin 63 is withdrawn, the boring bar raised, the centering device removed therefrom, the boring head slipped on the boring bar, the pin 63 inserted through the collar, hub and hole at the top of the boring bar, and the boring head clamped upon the boring bar, directly above the cylinder block. The power is thrown on and the machine started. The worm gear wheel is thereby rotated by the worm pinion and the boring bar rotated by the floating compensating collar connection between the worm gear wheel and boring bar. The boring bar rotates the worm gear 57 which rotates the worm gear wheels 56 and they in turn rotate the short shafts 53 with their pinions 54 which advance the cross head and the boring bar by reason of their engagement with the racks. The boring head and cutting tools are thereby advanced through the bore of the cylinder and the wall thereof is re-bored. When the boring head has been run through the cylinder, the machine is stopped, the short shafts 53 are retracted to demesh the pinions 54 from the racks 55, the boring bar is raised and the boring head is removed. The same operation is repeated for each cylinder of the cylinder block that requires to be re-bored.

It will be observed that by reason of the floating compensating connecting means between the drive gear wheel 25 and boring bar 19, the latter is driven or rotated on its true axis and therefore there is no tendency for it to get out of alignment. Moreover, the boring bar operates to advance the cutting tools by reason of the feed gearing which is operated by said boring bar. It is also to be observed that said gearing may be instantly rendered inoperative, thereby permitting the boring bar to be raised and lowered independently of said gearing. The cylinder block may be quickly centered by reason of the centering devices which forms part of the machine and the machine, in its entirety, may be operated by persons not specially skilled in the art of boring or re-boring cylinders.

More or less variation of the exact details of construction is possible without departing from the spirit of this invention; I desire, therefore, not to limit myself to the exact form of the construction shown and described, but intend, in the following claims, to point out all of the invention disclosed herein.

I claim as new and desire to secure by Letters Patent:

1. A boring machine comprising a base, a standard extending up therefrom, said base and standard having aligned bearing apertures, an endwise movable boring bar, rotatively mounted in said bearing apertures, a boring head removably secured to said boring bar between said bearing apertures, a driven, rotative member capable of rotating on an axis non-centric with respect to the axis of said boring bar, and a compensating member having drive connections with said rotative member and with said boring bar.

2. A boring machine comprising a base, a standard extending up therefrom, said base and standard having aligned bearing apertures, an endwise movable boring bar, rotatively mounted in said bearing apertures, a boring head removably secured to said boring bar between said bearing apertures, a drive pinion, a worm gear wheel driven thereby and capable of rotating on an axis non-centric with respect to the axis of said boring bar, and a compensating drive collar loosely mounted on the boring bar and having drive connections with said worm gear wheel and with said boring bar.

3. A boring machine comprising a base, a standard extending up therefrom, said base and standard having aligned bearing apertures, an endwise movable boring bar, relatively mounted in said bearing apertures, a boring head removably secured to said boring bar between said bearing apertures, a driven worm gear wheel capable of rotating on an axis non-centric with respect to the axis of said boring bar and having a hub formed with driving lugs projecting therefrom, and a compensating drive collar surrounding said boring bar and having notches in which said lugs engage, and having inwardly projecting driving lugs engaging in key-ways in the boring bar.

4. A boring machine comprising a base, a standard extending up therefrom, said base and standard having aligned gearing apertures, an endwise movable boring bar, rotatively mounted in said bearing apertures, a boring head removably secured to said boring bar between said bearing apertures, a driven worm gear wheel capable of rotating on an axis non-centric with respect to the axis of said boring bar and having a hub formed with collar supporting and driving lugs, and a compensating drive collar surrounding said boring bar and supported by said worm gear wheel hub, said collar having inwardly projecting lugs engaging in key-ways in the boring bar.

5. A boring machine comprising a base, a standard extending up therefrom, said base and standard having aligned bearing apertures, an endwise movable boring bar, rotatively mounted in said bearing apertures, a boring head removably secured to said boring bar between said bearing apertures, a driven worm gear wheel capable of rotating on an axis non-centric with the axis of said boring bar, and having a hub formed with tapered driving lugs, and a compensating drive collar surrounding said boring bar and formed with grooves having under-cut inclined edges with which said tapered lugs engage, said collar having also inwardly projecting driving lugs engaging in key-ways in said boring bar.

6. A boring machine comprising a base, a standard extending up therefrom, said base and standard having aligned bearing apertures, an endwise movable boring bar rotatively mounted in said bearing apertures, a boring head removably secured on said boring bar intermediate said bearing apertures, driving means for rotating said boring bar, and boring bar feed gearing, one element of which is connectible with said boring bar and disconnectible therefrom, whereby said bar may be moved relative thereto in an endwise direction, the other elements embracing a plurality of toothed members which extend up from the standard and are disposed around said boring bar.

7. A boring machine comprising a base, a standard extending up therefrom, said base and standard having aligned bearing apertures, an endwise movable boring bar rotatively mounted in said bearing apertures, a boring head removably secured on said boring bar intermediate said bearing apertures, driving means for rotating said boring bar, and boring bar feed gearing including a worm gear, connectible with sair boring bar and disconnectible therefrom, a cross-head, rack bars, toothed members journalled in said cross-head and meshable with and demeshable from said rack bars, and worm gear wheels secured to said toothed members, and meshing with said worm gear.

8. A boring machine comprising a base, a standard extending up therefrom, said base and standard having aligned bearing apertures, an endwise movable boring bar rotatively mounted in said bearing apertures, a boring head removably secured on said boring bar intermediate said bearing apertures, driving means for rotating said boring bar, and boring bar feed gearing, including a worm gear wheel, connectible with said boring bar and disconnectible therefrom, a cross head, worm gear wheels meshing with said worm gear, rack bars secured to said standard, pinions meshing with said rack bars, and capable of being demeshed therefrom, and shafts journalled in said cross head and bearing said worm gear wheels and pinions.

9. A boring machine comprising a base, a standard extending up therefrom, said base and standard having aligned bearing apertures, an endwise movable boring bar rotatively mounted in said bearing apertures, a boring head removably secured on said boring bar intermediate said bearing apertures, driving means for rotating said boring bar, a worm gear secured to said boring bar, rack bars secured to said standard and gearing between said worm gear and rack bars, including means for operatively connecting said worm gear with said rack bars and disconnecting it therefrom.

10. A boring machine comprising a base, a standard extending up therefrom, said base and standard having aligned bearing apertures, an endwise movable boring bar rotatively mounted in said bearing apertures, a boring head removably secured on said boring bar intermediate said bearing apertures, driving means for rotating said boring bar, a worm gear secured to said boring bar, posts secured to said standard and having rack teeth thereon, a cross-head guided on said posts, endwise movable shafts journalled in said cross-head and having worm gear wheels fast thereon and meshing with said worm gear, said shafts having also pinions meshable with and demeshable from said rack teeth.

11. A boring machine comprising a work supporting base, clamping means for clamping the work solely to the base, a rigid standard fixedly secured to the base and extending up therefrom and having a part overhanging the work, said base and standard having aligned bearing apertures between which the work is held by said clamping means, an endwise movable boring bar rotatively mounted in said bearing apertures, a boring head secured on said boring bar intermediate said bearing apertures, driving means for rotating said boring bar, mounted on said base, the boring bar and driving means being connectible and disconnectible, and boring bar feed mechanism driven by said boring bar, connectible therewith and disconnectible with respect to the boring bar.

12. A boring machine, comprising a work supporting and squaring base, clamping means for clamping the work solidly to the base, a rigid standard fixedly secured to the base and extending up therefrom and having a part overhanging the work, said base and the part of the standard overhanging the work having aligned bearing apertures between which the work is held by said clamping means, boring bar rotating means located below the bearing aperture in the base, an endwise movable boring bar rotatively mounted in said bearing apertures and operatively connected with said boring bar rotating means, but capable of being disconnected from said boring bar rotating means and withdrawn from said lower bearing aperture, whereby the work may be inserted between said bearing apertures, a boring head on said boring bar intermediate said bearing apertures, and boring bar feed mechanism driven by said boring bar.

13. In a boring machine, a work supporting base, a rigid standard fixedly secured to the base and extending up therefrom, said base and standard having aligned bearing apertures between which the work is held, and endwise movable boring bar rotatively mounted in said bearing apertures, and having key ways at one end, and a worm gear on its other end, a boring head on said boring bar intermediate said bearing apertures, driving means having keys adapted to engage in the key ways of the boring bar, and boring bar feed mechanism operated by said worm gear upon rotation of the boring bar.

14. In a boring machine, the combination of a boring bar having a plurality of key ways at one end thereof, disposed equidistant about its axis, and a feed actuating worm gear at its other end, cooperating feed mechanism for the bar operated by said worm gear upon rotation of the bar, and boring bar rotating means having a plurality of equidistant keys adapted to engage in the key ways of the boring bar, whereby said bar is driven from a plurality of equidistant places about its axis.

15. In a boring machine, a work supporting base and a standard extending up therefrom, said base and standard having aligned bearing apertures, an endwise movable boring bar rotatively mounted in said bearing apertures, boring bar driving means with which said boring bar my be operatively connected and disconnected, a non-rotating body mounted on said bar, a feed mechanism member operated upon rotation of the bar and carried by said non-rotating body, and a rack bar parallel with said boring bar and fixedly secured to said standard, said non-rotating body being slidably mounted on said rack bar, and the latter cooperating with said feed mechanism member to feed said bar upon rotation of the bar.

JOHN G. ZUBER.